US009930227B2

(12) United States Patent
Pfiffi

(10) Patent No.: US 9,930,227 B2
(45) Date of Patent: Mar. 27, 2018

(54) SURVEILLANCE CAMERA FOR INSTALLATION ON A BUILDING STRUCTURE AND HAVING A MOUNTING HOUSING IN PARTICULAR FOR SURFACE MOUNTING

(71) Applicant: MOBOTIX AG, Langmeil (DE)

(72) Inventor: Horst Pfiffi, Queidersbach (DE)

(73) Assignee: MOBOTIX AG, Langmeil (DE)

( * ) Notice: Subject to any disclaimer, the term of this patent is extended or adjusted under 35 U.S.C. 154(b) by 0 days.

(21) Appl. No.: 15/173,171

(22) Filed: Jun. 3, 2016

(65) Prior Publication Data

US 2016/0366311 A1 Dec. 15, 2016

(30) Foreign Application Priority Data

Jun. 11, 2015 (EP) .................................... 15171599

(51) Int. Cl.
*H04N 5/225* (2006.01)
*G08B 13/196* (2006.01)
*H04N 7/18* (2006.01)

(52) U.S. Cl.
CPC ..... *H04N 5/2252* (2013.01); *G08B 13/19619* (2013.01); *H04N 5/2253* (2013.01); *H04N 7/18* (2013.01)

(58) Field of Classification Search
None
See application file for complete search history.

(56) References Cited

U.S. PATENT DOCUMENTS

| 6,093,044 | A | 7/2000 | Arbuckle | |
|---|---|---|---|---|
| 6,268,882 | B1 * | 7/2001 | Elberbaum | G08B 13/19619 348/143 |
| 9,578,291 | B2 * | 2/2017 | DiPoala | G08B 17/00 |
| 2002/0054234 | A1 | 5/2002 | Patel et al. | |
| 2004/0048507 | A1 * | 3/2004 | Hage | G08B 13/19619 439/332 |
| 2006/0050150 | A1 | 3/2006 | Yamane | |

(Continued)

FOREIGN PATENT DOCUMENTS

| DE | 102008049872 A1 | 4/2010 |
|---|---|---|
| DE | 102008062997 A1 | 7/2010 |
| DE | 202015102154 U1 | 6/2015 |

*Primary Examiner* — James Hannett
(74) *Attorney, Agent, or Firm* — Quarles & Brady LLP

(57) ABSTRACT

A surveillance camera includes a camera housing, an objective on a front side of the camera housing, camera electronics in the camera housing, and a mounting housing mountable to building structure and in which the camera housing can be detachably secured. The mounting housing includes an opening pointing away from the building structure, through which opening the camera housing can be inserted into the mounting housing. At least one automatically active securing element on the camera housing and/or in the mounting housing detachably secures the camera housing in the mounting housing in a defined functional position. The camera housing is adjustable from the functional position into a dismantling position by application of a force, and wherein in the dismantling position at least one securing element is disengaged and/or a grip contour is made accessible on the outside of the camera housing for application of a manual traction force.

20 Claims, 5 Drawing Sheets

(56) References Cited

U.S. PATENT DOCUMENTS

| | | | |
|---|---|---|---|
| 2006/0147194 A1* | 7/2006 | Jones | G08B 13/1963 |
| | | | 396/427 |
| 2007/0126871 A1 | 6/2007 | Henninger, III et al. | |
| 2008/0211913 A1 | 9/2008 | Togawa | |
| 2011/0261196 A1 | 10/2011 | Gabel | |
| 2012/0002048 A1 | 1/2012 | Hinkel | |
| 2013/0114950 A1 | 5/2013 | Wang et al. | |
| 2014/0375874 A1* | 12/2014 | Asano | H04N 5/2252 |
| | | | 348/373 |
| 2016/0360076 A1* | 12/2016 | Stark | F16M 13/02 |

* cited by examiner

SURVEILLANCE CAMERA FOR INSTALLATION ON A BUILDING STRUCTURE AND HAVING A MOUNTING HOUSING IN PARTICULAR FOR SURFACE MOUNTING

CROSS-REFERENCE TO RELATED APPLICATIONS

This application claims the benefit of European Patent Application No. 15 171 599.2 filed Jun. 11, 2015. The contents of which is hereby incorporated by reference as if set forth in its entirety herein.

STATEMENT REGARDING FEDERALLY SPONSORED RESEARCH OR DEVELOPMENT

Not applicable.

FIELD OF THE INVENTION

The invention relates to a surveillance camera for installation on a building structure.

BACKGROUND OF THE INVENTION

Generic surveillance cameras, in particular digital network cameras, are known from the state of the art and their use is widespread. The surveillance cameras are mounted outside, for example on houses or poles. Surveillance cameras are also placed inside, on the walls of corridors and stairwells or close to the entrances to or exits from offices and stores. Known surveillance cameras have a camera housing which is mounted to the building structure in a so-called surface installation with the aid of a separate mounting housing. A surveillance camera for surface installation is known from DE 10 2008 049 872 A1, for example. Another surveillance camera for surface installation is known from DE 10 2008 062 997 A1.

With the known surveillance cameras for surface installation, the mounting housing is initially mounted to the outer side, i.e. on plaster, in the intended position on the building structure; and afterwards, the surveillance camera is secured to the mounting housing. After arranging the surveillance camera in the mounting housing, an additional cover is affixed to the edge of the mounting housing and the surveillance camera is secured at the same time, said cover preventing the unintended detachment of the surveillance camera from the mounting housing on the one hand and concealing possible grooves and retaining elements necessary for construction in a visually appealing design on the other hand.

A disadvantage of such multi-piece mounting devices for securing the camera housing in the mounting housing is the great effort required for assembly and the costly production of the different components. Another disadvantage is that the assembly and dismantling, respectively, of the surveillance camera, e.g. when the camera housing needs to be removed from the mounting housing for servicing purposes, cannot be carried out without the use of tools.

SUMMARY OF THE INVENTION

Therefore, the object of the invention at hand is to propose a surveillance camera for mounting in a mounting housing, said housing being made up of simple components and additionally allowing the camera housing to be assembled in and dismantled from the mounting housing without the use of tools. This object is attained by a surveillance camera having a mounting housing, such as disclosed herein.

The inventive surveillance camera is initially characterized in that an opening pointing away from the building structure is provided in the mounting housing, through which opening the camera housing can be inserted into the mounting housing during assembly. In accordance with the invention, at least one automatically active securing element is provided at the camera housing and/or in the mounting housing, by means of which securing element the camera housing is detachably secured in the mounting housing in a defined functional position. The automatic action of the securing element is to be understood to the effect that the securing of the camera housing to the mounting housing is realized solely by the insertion of the camera housing into the designated opening in the mounting housing by the user until the camera housing has reached the pre-defined functional position in the mounting housing. In particular, the automatically active securing elements are to be designed in such a way that the use of tools during assembly of the camera housing in the mounting housing is not required.

Another object of the invention is to enable a dismantling of the camera housing from the mounting housing without tools. Since the securing elements for securing the camera housing in the mounting housing act automatically, specific measures need to be undertaken. According to the invention, it is intended that the camera housing is not entirely locked in place after reaching its functional position. In fact, the securing of the camera housing in the mounting housing in the functional position is realized in such a way that after reaching the functional position, an adjustment of the camera housing from the functional position into a dismantling position is still possible. The adjustment between the functional position and the dismantling position takes place by an application of a pressure force to the front side of the camera housing. In other words, the user must first apply a pressure force to the front side of the camera housing when dismantling the camera housing from the mounting housing. By application of said pressure force, the camera housing will then be adjusted from the functional position into the dismantling position.

The dismantling position of the camera housing in the mounting housing is characterized in that at least one securing element is disengaged and/or a grip contour is made accessible on the outside of the camera housing for the application of a manual traction force. By disengaging at least one securing element or by creating a grip contour for the application of a manual traction force, it is then easily possible for the user to pull out the camera housing from the opening of the mounting housing without any tools in order to achieve the desired dismantling.

The way in which the automatically acting securing elements are formed on the surveillance camera is generally arbitrary. According to a first embodiment, it is provided that at least two swivelably mounted supporting arms are provided as automatically active securing elements at the rear side of the camera housing. Said supporting arms can be swiveled between a securing position radially protruding over the camera housing and a back-swiveled assembly position. Moreover, the supporting arms are elastically prestressed with a pre-tension force, wherein the pre-tension force pushes each of the supporting arms into the radially protruding securing position. In order to mount the camera housing in the mounting housing, the supporting arms can be swiveled into the assembly position against the pre-tension force and the camera housing can be inserted into the opening of the mounting housing. As soon as the supporting arms are no longer pushed aside by the fingers of the user, the supporting arms automatically swivel back into the securing position by means of the pre-tension force and engage behind the edge of the opening of the mounting housing in order to detachably secure the camera housing in the mounting housing.

In the dismantling of surveillance cameras of this type provided with supporting arms a swivel movement of at least one supporting arm in the direction of its back-swiveled assembly position is carried out by adjusting the camera housing from the functional position into the dismantling position. As soon as the camera housing has reached the dismantling position, either one of the supporting arms is swiveled back so far that it no longer engages behind the opening of the mounting housing, or a grip contour for applying a manual traction force has been created. The user can pull out the camera housing from the opening of the mounting housing with the grip contour, thus disengaging the supporting arms. The function and design of supporting arms for securing camera housings is further explained, for example, in DE 20 2015 102 154 U1, with explicit reference to said document.

As an alternative to the use of swivelably mounted supporting arms, locking elements can be provided as automatically active securing elements on the camera housing and/or in the mounting housing. Said locking elements are to be arranged and designed in such a way that an opposing locking contour is engaged behind in a form-fitting and/or force-fitting manner when the camera housing is arranged in the functional position in the mounting housing in order to realize the desired automatically active securing of the camera housing in the mounting housing. By using such locking elements, it is possible, in particular, to secure the camera housing in the mounting housing with very little installation space, since the supporting arms for securing the camera housing require a correspondingly large swivel range in which they can be moved without collision, for example.

It is particularly advantageous from a constructive point of view if the locking elements are formed as resiliently mounted locking arms, wherein a locking pin is provided at the free end of the locking arms, said locking pin being able to engage behind an opposing locking contour in a form in-fitting and/or force-fitting manner when the camera housing is arranged in the functional position in the mounting housing.

If the camera housing is designed to be secured to the mounting housing exclusively with the aid of the locking elements, it is particularly cost-efficient to form the locking elements integrally with either the camera housing or the mounting housing. This can be carried out in particular by injecting the locking elements from plastic material in one piece in an injection mold.

If for the forming of the inventive surveillance camera, camera housings are used which can be secured also with other securing means if need be, it is particularly advantageous if the locking elements are not formed integrally with the camera housing but are affixed to the camera housing optionally, depending on the desired function. The optional affixing of the locking elements on the camera housing can preferably be carried out by using an adapter ring. The locking elements as such are formed on the adapter ring, and the adapter ring can be secured either to the camera housing and/or to the mounting housing. It is particularly advantageous if the adapter ring can be locked into place on the camera housing or in the mounting housing. By combining the adapter ring with a standard camera housing or a standard mounting housing, it can be achieved that the standard camera housing or the standard mounting housing can be used for forming an inventive surveillance camera.

In order to realize the inventive adjustability of the camera housing between the pre-defined functional position in which the standard operation of the surveillance camera takes place, and the dismantling position in which at least one of the securing elements is disengaged or a grip contour is made accessible for applying a manual traction force, a plethora of constructive possibilities is possible. A particularly simple and cost-efficient way to realize the adjustment between the functional position and the dismantling position is possible if a collar is provided at the inner circumference of the mounting housing. Said collar is initially characterized in that the side of the collar pointing to the opening of the mounting housing defines an abutment plane against which the camera housing in the functional position can be brought into abutment at least in sections with a radially protruding cover rim. In other words, during the assembly of the camera housing, said camera housing is first inserted through the opening of the mounting housing, the inserting motion then being continued until the cover rim of the camera housing abuts against the side of the collar pointing towards the opening. The abutment of the cover rim against the collar is the latest stage at which the automatic securing of the camera housing in the mounting housing must be realized by the locking elements.

For the purpose of adjustment of the camera housing between the functional position and the dismantling position, the collar comprises a recess pointing to the opening of the mounting housing. In other words, in the functional position the cover rim of the camera housing does not abut against the complete circumference on the side of the collar pointing towards the opening, but a gap is provided between the cover rim and the collar along part of the circumference, i.e. in the area of the recess. If the camera housing is to be adjusted into the dismantling position, the user applies the required pressure force to the front side of the camera housing, thus adjusting the camera housing into the dismantling position, wherein the gap between the cover rim and the collar is passed through. If in the dismantling position the cover rim of the camera housing abuts at least in sections against the side of the recess pointing to the opening of the mounting housing, at least one securing element is disengaged in this position or a grip contour is made accessible for applying a manual traction force.

Regarding an exact guiding of the camera housing when adjusting the same between the functional position and the dismantling position, it is particularly advantageous if the recess defines a second abutment plane against which the cover rim of the camera housing can abut at least in sections in the dismantling position. Said second abutment plane formed by the recess is to be arranged angularly inclined relative to the first abutment plane. If the camera housing is now arranged in the functional position, the intermediate angle between the two abutment surfaces brings about the required gap between the cover rim of the camera housing and the second abutment surface of the collar. Additionally, the intersection line between the first abutment surface and the second abutment surface defines a tilt edge around which the camera housing is tilted when being adjusted between the functional position and the dismantling position. Therefore, if the user applies the required pressure force to the front side of the camera housing for adjusting the camera housing into the dismantling position, the camera housing is swivelably adjusted around the tilt edge until the cover rim abuts against the second abutment surface of the collar.

In order to realize a reliable and simple securing of the camera housing in the mounting housing, it is particularly advantageous if the collar around the inner circumference of the mounting housing forms a closed ring. This ensures that even when turning the camera housing relative to the mounting housing around its vertical axis, a securing of the locking elements at the side of the mounting housing pointing away from the opening can be realized at any time and without any specific alignment by a corresponding engagement from behind.

In order to facilitate the unlocking of the locking elements when adjusting the camera housing from the functional position into the dismantling position, a rounding or bevel can be provided at the side of the collar pointing away from the opening of the mounting housing. This rounding or bevel is then engaged from behind by the locking elements, for example the locking pins arranged on the locking arms, in a force-fitting manner thus realizing the desired securing of the camera housing. Due to the missing form lock between the locking elements on the one hand and the locking contour on the collar on the other hand, it is achieved that no undesired high pressure forces have to be applied to the front side of the camera housing when adjusting the camera housing from the functional position into the dismantling position.

In order to facilitate inserting the camera housing into the mounting housing when using locking elements, it is particularly advantageous if a starting slope is provided at each free end of the locking elements. Said starting slopes allow the locking elements to slide off the collar with the starting slope when inserting the camera housing into the mounting housing. Additionally, an inward-directed force is caused to act on the free ends of the locking elements so that the locking elements are swiveled elastically towards the inside with their free ends. If the camera housing then reaches the functional position, the elastic pre-tension of the locking elements causes the free ends of the locking elements to swivel back and the locking pins to engage behind the locking contour so as to secure the same.

In surveillance cameras, the forming of water droplets must be avoided in the area of the camera objective at all costs, since water droplets massively disturb the image display. To ensure this, it is advantageous if the opening of the mounting housing is skirted by a drip edge which in particular has a closed circumference. The drip edge is to be formed in such a way that the mounting housing slightly protrudes over the front side of the camera housing or is at least aligned flush with the same when the camera housing is in the functional position. The achieved result is that after rain water or condensation water has run down the outside of the mounting housing, the rain water or condensation water drips off the drip edge and does not reach the camera objective on the front side of the camera housing. The inventive creation of the possibility to adjust the camera housing into the dismantling position enables the creation of the drip edge without any problems, since the required grip contour and the unlocking of the securing elements, respectively, for dismantling can be realized by the adjustment of the camera housing into the dismantling position.

The exterior design of the mounting housing is generally arbitrary. Depending on the type of surveillance camera used, the mounting housing can be formed as a surface-mounted housing shaped either round, oval or rectangular. The surface-mounted housing itself should be mountable to the wall of a building structure by means of affixing securing elements.

The dismantling of the camera housing from the mounting housing is considerably facilitated if the required pressure force for adjusting the camera housing into the dismantling position is applied in a targeted manner to the proper spot on the front side of the camera housing. In order to facilitate this, it is particularly advantageous if a corresponding marking is made in the camera housing to mark a pressure point. The position of said pressure point is to be chosen in such a way that the required pressure force for adjusting the camera housing from the functional position into the dismantling position is as small as possible. Should the dismantling of the camera housing be impeded for unauthorized persons, it is advantageous to forgo a marking.

An embodiment of the invention is schematically illustrated in the drawings and is further explained hereinafter by way of example.

BRIEF DESCRIPTION OF THE DRAWINGS

In the figures

DETAILED DESCRIPTION OF THE EXAMPLE EMBODIMENTS

Figure 1:
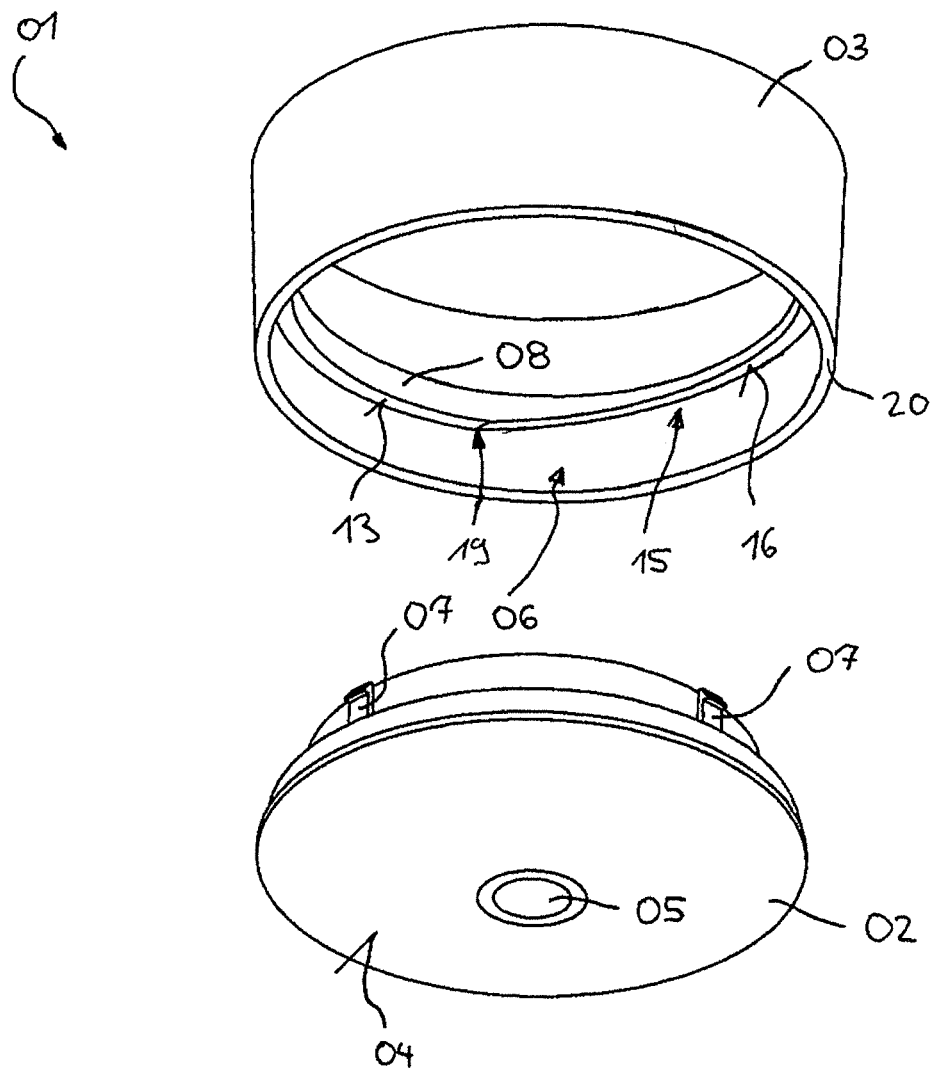
FIG. 1 shows a camera housing with a corresponding mounting housing in a dismantled state in a perspective view from the bottom.

FIG. 1 shows a surveillance camera 01 having a camera housing 02 and a mounting housing 03. The objective 05 of the surveillance camera 01 is arranged on the front side 04 of the camera housing 02. The other components of the surveillance camera 01, in particular the camera electronics arranged inside the camera housing 02 and the electric contact elements provided on the rear side of the camera housing 02, are not illustrated in the drawings and correspond to the already known state of the art.

The mounting housing 03 is formed as a type of surface-mounted housing and can be mounted to a building structure by means of securing means not illustrated in the drawings, such as fastening straps, for example, using corresponding fastening screws. In order to secure the camera housing 02 to the mounting housing 03, the camera housing 02 is initially inserted into the mounting housing 03 through the opening 06 pointing away from the building and is slid in until the automatically active securing elements 07, formed as locking arms having locking pins, engage behind the functionally complementary locking contour at the collar 08, thus securing the camera housing in its functional position to the mounting housing.

Figure 2:
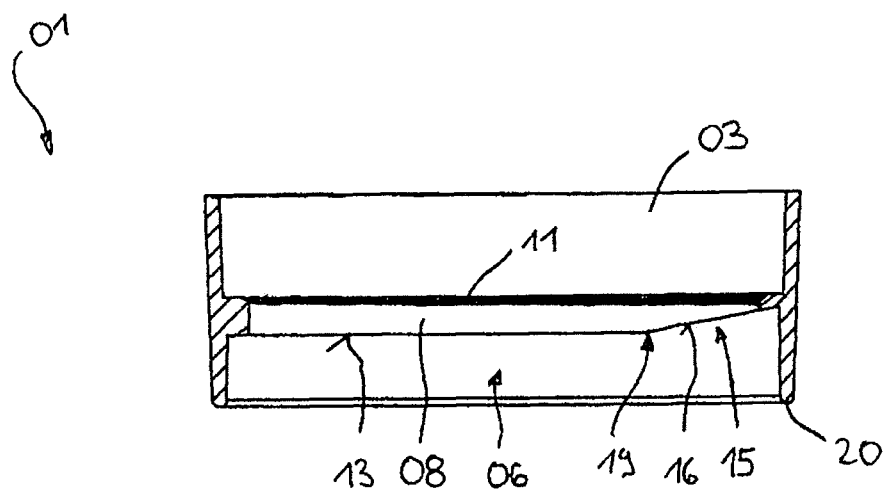
FIG. 2 shows the mounting housing with the dismantled camera housing according to FIG. 1 in cross-section.
Figure 2:
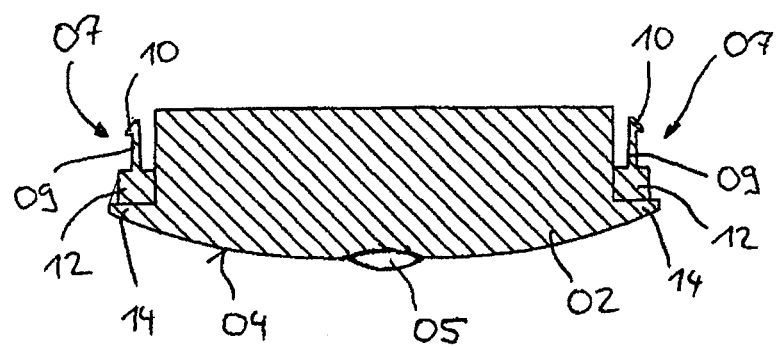

FIG. 2 shows the surveillance camera 01 having the mounting housing 03 and the dismantled camera housing 02 in a schematic cross-section. In particular, the functional elements found in the inside of the camera housing 02, for example the camera electronics and the camera connections, except for the schematically depicted objective 05, are not illustrated in the drawing. The automatically active securing elements 07 are formed as locking arms 09 with one locking pin 10 formed at each free end. In the functional position of the camera housing 02 at the mounting housing 03, the locking pins 10 engage behind the locking contour 11 arranged at the side of the collar 08 pointing away from the opening 06. The locking arms are, however, not formed integrally with the camera housing 02 but are secured to the camera housing 02 by means of an adapter ring 12. This allows the use of a standard camera housing 02 without locking arms for implementing the surveillance camera 01 by correspondingly upgrading the camera housing using the adapter ring 12 having the locking arms 09.

Figure 3:
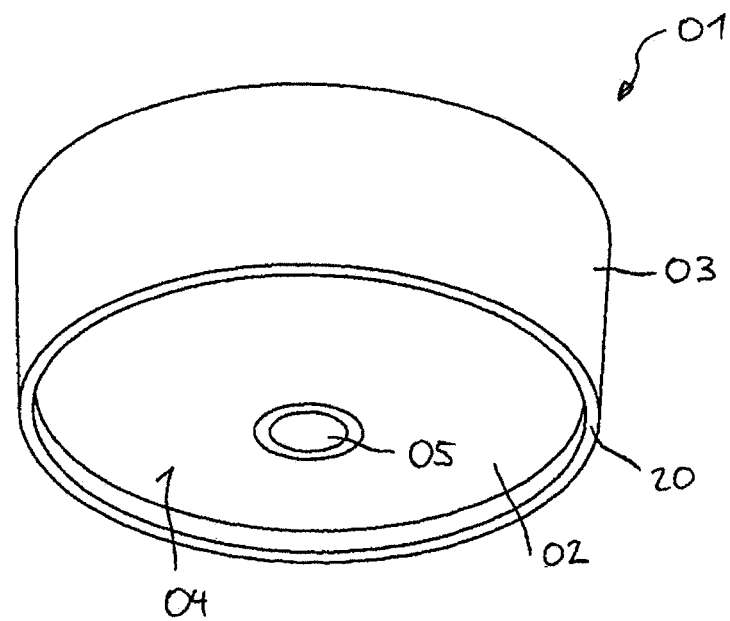
FIG. 3 shows the mounting housing with the camera housing mounted therein in the functional position in a perspective view from the bottom.

As can be seen in FIG. 1 and FIG. 2, a level abutment surface 13 is formed at the side of the collar 08 pointing towards the opening 06, said abutment surface defining a first abutment plane. In the functional position of the camera housing 02 in the mounting housing 03 (see FIG. 3 and FIG. 4) the cover rim 14 indirectly abuts against said abutment surface 13 via the adapter ring 12. In this position, all the locking pins 10 of the locking arms 09 engage at the locking contour 11 and secure the camera housing 02 in the mounting housing 03 in the functional position.

As can be seen in FIG. 1 and FIG. 2, the collar 08 on one side of the mounting housing 03 comprises a recess 15 which is also formed in the manner of a flat abutment surface 16 which defines a second abutment plane. The two abutment planes of the abutment surface 13 on the one hand and the abutment surface 16 on the other hand are inclined relative to each other at an angle of approximately 10°. The angle between the abutment surface 13 on the one hand and the abutment surface 16 on the other hand can be chosen depending on the design of the mounting housing 03 and the camera housing, respectively, so as to make accessible a grip contour for the application of a manual traction force in the dismantling position. An angle of less than 10° is preferred. However, the angle can be greater than 10° if necessary.

Figure 4:
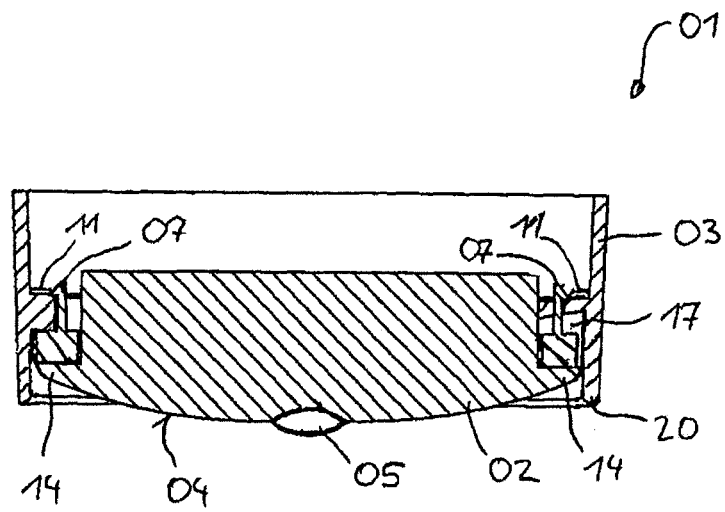
FIG. 4 shows the mounting housing with the camera housing mounted therein in the functional position according to FIG. 3 in cross-section.

If the camera housing 02, as shown in FIG. 4, is in its functional position, a gap 17 is realized by a recess 15 on one side of the mounting housing 03. This means that the camera housing 02 in its functional position does not abut against the abutment surface 13 of the collar 08 in the area of the recess 15 but is separated from the collar 08 by the gap 17.

Figure 5:
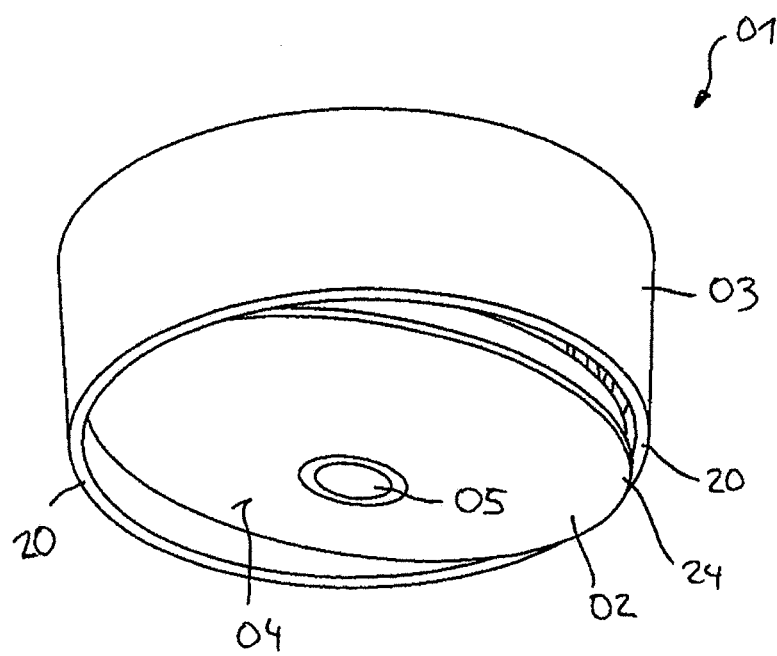
FIG. 5 shows the mounting housing with the camera housing according to FIG. 3, after the camera housing has been swiveled into the dismantling position, in a perspective view from the bottom.
Figure 6:
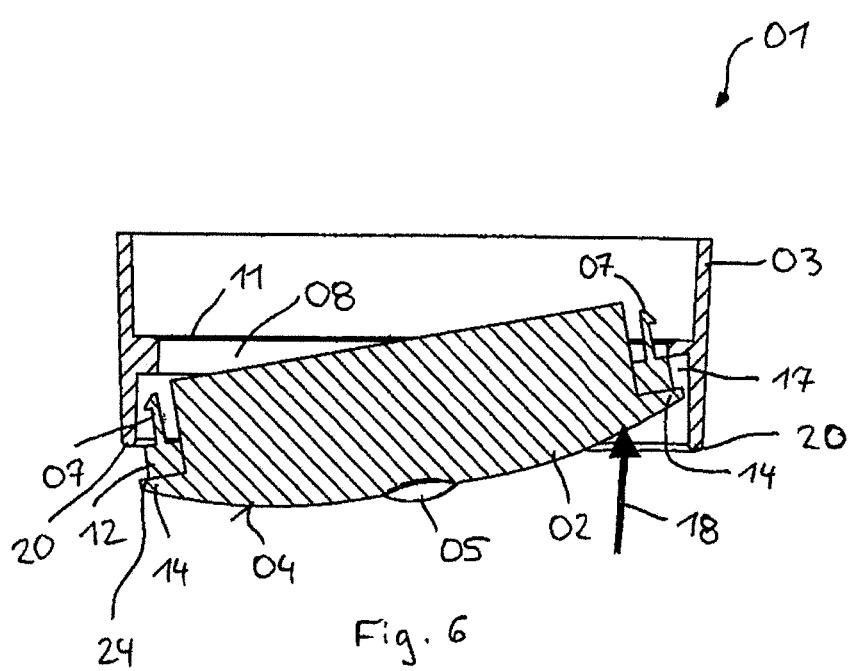
FIG. 6 shows the mounting housing with the camera housing adjusted into the dismantling position according to FIG. 5 in cross-section.

If the camera housing 02 is to be dismantled from the mounting housing 03, the steps schematically shown in FIG. 5 and FIG. 6 are to be carried out. In order to adjust the camera housing into the dismantling positions shown in FIG. 5 and FIG. 6, a pressure force 18, schematically illustrated in FIG. 6, must be applied in the area of the recess 15 to the front side 04 of the camera housing 02. Due to the gap 17 between the camera housing 02 on the one hand and the mounting housing 03 on the other hand, the pressure force 18 cannot be absorbed at first, so that the pressure force 18 causes a swivel movement of the camera housing 02 relative to the mounting housing 03. During said swivel movement, the camera housing 02 is tilted around the tilt edge 19 (see FIG. 1 and FIG. 2) being defined by the intersection line between the two abutment planes of the abutment surfaces 13 and 16.

Finally, the camera housing 02 abuts against the abutment surface 16 of the recess 15 via the adapter ring 12. In said dismantling position, the securing element 07a arranged on the opposite side is disengaged. Additionally, the cover rim 14 protrudes over the drip edge 20 formed on the bottom side of the mounting housing 03 in the area of the disengaged securing element 07a, so that a grip contour 24 is made accessible in this area for applying a manual traction force. The result is that in the dismantling position illustrated in FIG. 5 and FIG. 6, the user is able to easily pull out the camera housing 02 from the mounting housing 03 and dismantle it.

Figure 7:
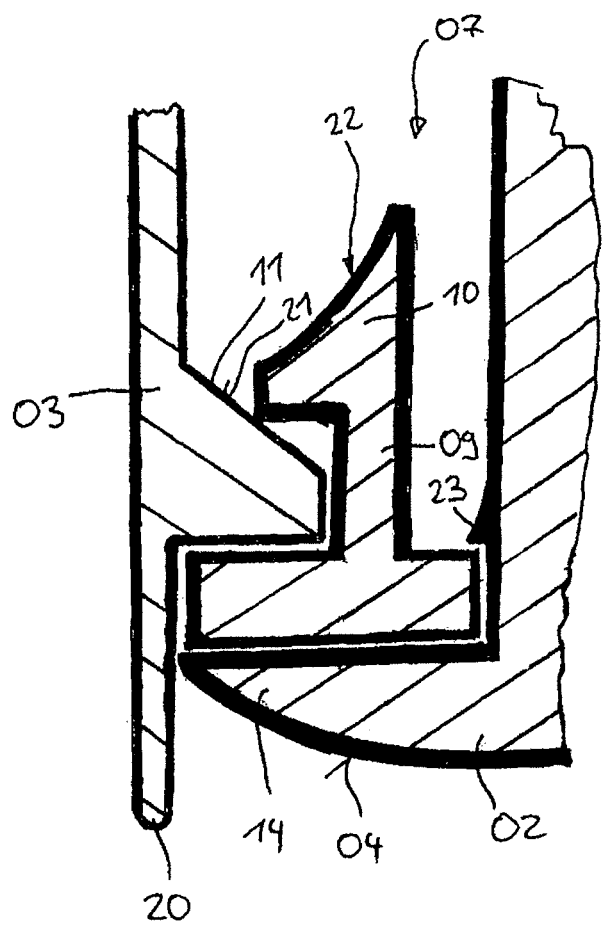
FIG. 7 shows a locking element of the camera housing engaged at the locking contour of the mounting housing in an enlarged cross-section.

FIG. 7 shows the mounting housing 03 having the collar 08 and the camera housing 02 with the adapter ring 12 and the securing element 07 formed thereon in an enlarged view. It can be seen that a bevel 21 is formed at the locking contour 11 of the collar 08, the locking pin 10 of the securing element 07 engaging with said bevel 21 from behind in a force-fitting manner. By means of the bevel 21, the unlocking of the locking pin 10 is considerably facilitated when adjusting the camera housing 02 into the dismantling position. Alternatively to the shown embodiment, it is also possible to form the collar 08 without a bevel and to provide a bevel at the locking pin 10 instead. It is also possible to provide the collar 08 and the locking pin 10 with a bevel.

Depending on the inclination chosen for the bevel 21, the required pressure force 18 for adjusting the camera housing 02 into the dismantling position can be varied. Additionally, it is also possible to influence the required pressure force 18 for adjusting the camera housing 02 into the dismantling position by varying the position of the tilt edge. This is because, depending on the position of the tilt edge, the lever arm with which the pressure force 18 acts on the camera housing 02 is enlarged or reduced.

Additionally, a starting slope 22 is provided at the free end of the locking arm 09, said starting slope 22 facilitating the insertion of the securing elements 07 into the opening 06. Alternatively to the shown embodiment, it is also possible to not provide the free end of the locking arm 09 with a starting slope and instead to provide a starting slope at the front side of the collar 08.

The adapter ring 12 is engaged and secured at a locking protuberance 23 of the camera housing 02.

The invention claimed is:

1. A surveillance camera for installation on a building structure, said surveillance camera comprising:
    a camera housing having a front side and a rear side;
    an objective on the front side of the camera housing;
    camera electronics disposed in the camera housing;
    at least one electric connecting element at the rear side of the camera housing;
    a mounting housing mountable to the building structure and in which the camera housing can be detachably secured, wherein the mounting housing includes an opening pointing away from the building structure, through which opening the camera housing can be inserted into the mounting housing; and
    at least one automatically active securing element on the camera housing and/or in the mounting housing, with which securing element the camera housing can be detachably secured in the mounting housing in a defined functional position, and wherein the camera housing is adjustable from the functional position into a dismantling position by application of a force, the securing element comprising at least one locking element formed as a resiliently mounted locking arm, wherein a locking pin is provided at a free end of the locking arm, said locking pin being able to engage behind an opposing locking contour in a form-fitting and/or force-fitting manner when the camera housing is arranged in the functional position in the mounting housing, and wherein in the dismantling position, the at least one securing element is disengaged and/or a grip contour is made accessible on the outside of the camera housing for the application of a manual traction force.

2. The surveillance camera according to claim 1, in which at least two swivelably mounted supporting arms are provided as automatically active securing elements at the rear side of the camera housing, wherein said supporting arms are swivelable between a securing position radially protruding over the camera housing and a back-swiveled assembly position, and wherein the supporting arms are elastically pre-stressed with a pre-tension force, and wherein the pre-tension force pushes each of the supporting arms in the radially protruding securing position in order to detachably secure the camera housing in the mounting housing.

3. The surveillance camera according to claim 1, in which the locking arm is formed integrally with the camera housing or the mounting housing.

4. The surveillance camera according to claim 1, in which the locking arm is formed on an adapter ring, wherein the adapter ring is secured on the camera housing or the mounting housing.

5. The surveillance camera according to claim 1, in which a closed or disrupted collar is provided at an inner circumference of the mounting housing, wherein a side of the collar pointing towards the opening of the mounting housing includes an abutment surface defining an abutment plane, against which the camera housing in the functional position can abut directly or indirectly, at least in sections, with a radially protruding cover rim, and wherein the collar includes a recess pointing towards the opening of the mounting housing, and wherein the cover rim of the camera housing in the dismantling position can abut at least in sections against the side of the recess pointing to the opening of the mounting housing.

6. The surveillance camera according to claim 5, in which the recess defines a second abutment plane, against which the cover rim of the camera housing in the dismantling position abuts at least in sections, wherein the second abutment plane is inclined angularly relative to the first abutment plane, and wherein the intersection line between the first abutment plane and the second abutment plane defines a tilt edge around which the camera housing can be tilted when being adjusted between the functional position and the dismantling position.

7. The surveillance camera according to claim 5, in which the collar forms a closed ring at the inner circumference of the mounting housing, wherein the locking elements arranged on the camera housing engage behind the collar in a form-fitting and/or force-fitting manner at the side pointing away from the opening of the mounting housing for securing the camera housing in the functional position.

8. The surveillance camera according to claim 5, in which a rounding or bevel is provided at a side of the collar pointing away from the opening of the mounting housing and/or at the locking pins of the locking arms, wherein the locking arms arranged on the camera housing engage behind the collar in a force-fitting manner with the locking pins, for securing the camera housing in the functional position.

9. The surveillance camera according to claim 1, in which a starting slope is provided at the free end of the locking arm and/or at the collar, said starting slope enabling a sliding of the locking arm off the collar when inserting the camera housing into the mounting housing, thus causing a force directed radially inwards to act on the free end of the locking arm.

10. The surveillance camera according to claim 1, in which the opening of the mounting housing is skirted by a drip edge which in particular has a closed circumference, wherein the drip edge of the mounting housing protrudes to some extent over the cover rim of the camera housing or is aligned flush with the front side of the cover rim when the camera housing is arranged in the functional position.

11. The surveillance camera according to claim 1, in which the mounting housing is a surface-mounted housing shaped either round, oval or rectangular, said surface-mounted housing being securable to the wall of a building structure by affixing securing elements.

12. The surveillance camera according to claim 1, in which a marking is made on the mounting housing and/or the camera housing, which marks a pressure point onto which the force required for adjusting the camera housing from the functional position into the dismantling position can be applied.

13. A method of using a surveillance camera having a camera housing according to claim 1 on a building structure, said method comprising:
    inserting a camera housing through an opening of a mounting housing mounted to a building structure;
    detachably securing the camera housing to the mounting housing using at least one automatically active securing element fixed on the camera housing and/or in the mounting housing; and
    adjusting the camera housing from the functional position into a dismantling position by application of a force, and wherein in the dismantling position said at least one securing element is disengaged and/or a grip contour is made accessible on an outside of the camera housing for the application of a manual traction force.

14. A surveillance camera for installation on a building structure, said surveillance camera comprising:
    a camera housing having a front side and a rear side;
    an objective on the front side of the camera housing;
    camera electronics disposed in the camera housing;
    at least one electric connecting element at the rear side of the camera housing;
    a mounting housing mountable to the building structure and in which the camera housing can be detachably secured, wherein the mounting housing includes an opening pointing away from the building structure, through which opening the camera housing can be inserted into the mounting housing, a closed or disrupted collar being provided at an inner circumference of the mounting housing, wherein a side of the collar pointing towards the opening of the mounting housing includes an abutment surface defining an abutment plane, against which the camera housing in the functional position can abut directly or indirectly, at least in sections, with a radially protruding cover rim, and wherein the collar includes a recess pointing towards the opening of the mounting housing, and wherein the cover rim of the camera housing in the dismantling position can abut at least in sections against the side of the recess pointing to the opening of the mounting housing; and at least one automatically active securing element on the camera housing and/or in the mounting housing, with which securing element the camera housing can be detachably secured in the mounting housing in a defined functional position, and wherein the camera housing is adjustable from the functional position into a dismantling position by application of a force, and wherein in the dismantling position, the at least one securing element is disengaged and/or a grip contour is made accessible on the outside of the camera housing for the application of a manual traction force.

15. The surveillance camera according to claim 14, in which the recess defines a second abutment plane, against which the cover rim of the camera housing in the dismantling position abuts at least in sections, wherein the second abutment plane is inclined angularly relative to the first abutment plane, and wherein the intersection line between the first abutment plane and the second abutment plane defines a tilt edge around which the camera housing can be tilted when being adjusted between the functional position and the dismantling position.

16. The surveillance camera according to claim 14, in which the collar forms a closed ring at the inner circumference of the mounting housing, wherein the locking elements arranged on the camera housing engage behind the collar in a form-fitting and/or force-fitting manner at the side pointing away from the opening of the mounting housing for securing the camera housing in the functional position.

17. The surveillance camera according to claim 14, in which a rounding or bevel is provided at a side of the collar pointing away from the opening of the mounting housing and/or at the locking pins of the locking arms, wherein the locking arms arranged on the camera housing engage behind the collar in a force-fitting manner with the locking pins, for securing the camera housing in the functional position.

18. The surveillance camera according to claim 14, in which the opening of the mounting housing is skirted by a drip edge which in particular has a closed circumference, wherein the drip edge of the mounting housing protrudes to some extent over the cover rim of the camera housing or is aligned flush with the front side of the cover rim when the camera housing is arranged in the functional position.

19. The surveillance camera according to claim 14, in which the mounting housing is a surface-mounted housing shaped either round, oval or rectangular, said surface-mounted housing being securable to the wall of a building structure by affixing securing elements.

20. The surveillance camera according to claim 14, in which a marking is made on the mounting housing and/or the camera housing, which marks a pressure point onto which the force required for adjusting the camera housing from the functional position into the dismantling position can be applied.

* * * * *

UNITED STATES PATENT AND TRADEMARK OFFICE
CERTIFICATE OF CORRECTION

PATENT NO.        : 9,930,227 B2
APPLICATION NO.   : 15/173171
DATED             : March 27, 2018
INVENTOR(S)       : Horst Pfiffi It is certified that error appears in the above-identified patent and that said Letters Patent is hereby corrected as shown below:

In the Specification

Column 3, Lines 44-45, "form in-fitting" should be --form-fitting--.

Signed and Sealed this
Fifth Day of June, 2018

Andrei Iancu
*Director of the United States Patent and Trademark Office*